United States Patent
Abello Rosello et al.

(10) Patent No.: US 11,225,025 B2
(45) Date of Patent: Jan. 18, 2022

(54) GENERATING ADDITIVE MANUFACTURING INSTRUCTIONS

(71) Applicant: HEWLETT-PACKARD DEVELOPMENT COMPANY, L.P., Houston, TX (US)

(72) Inventors: Lluis Abello Rosello, Sant Cugat del Valles (ES); Sergio Gonzalez, Sant Cugat del Valles (ES); Jordi Gonzalez Rogel, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 494 days.

(21) Appl. No.: 16/089,628

(22) PCT Filed: Oct. 27, 2016

(86) PCT No.: PCT/US2016/059153
§ 371 (c)(1),
(2) Date: Sep. 28, 2018

(87) PCT Pub. No.: WO2018/080501
PCT Pub. Date: May 3, 2018

(65) Prior Publication Data
US 2019/0118480 A1  Apr. 25, 2019

(51) Int. Cl.
*B29C 64/393* (2017.01)
*B29C 64/386* (2017.01)
(Continued)

(52) U.S. Cl.
CPC .......... *B29C 64/393* (2017.08); *B29C 64/386* (2017.08); *G06F 30/20* (2020.01);
(Continued)

(58) Field of Classification Search
CPC ...... B29C 64/393; B29C 64/386; G06T 17/10
(Continued)

(56) References Cited

U.S. PATENT DOCUMENTS 7,188,103 B2 *  3/2007  Furuhashi ..........  G06K 9/00208
7,397,473 B2 *  7/2008  Chakraborty ......  G06K 9/00214
                                                              345/419
(Continued)

FOREIGN PATENT DOCUMENTS

CN      105584040      5/2016
CN      105965884      9/2016
(Continued)

OTHER PUBLICATIONS

Chandru et al. (Voxel-Based Modeling for layered Manufacturing, 1995, IEEE, pp. 42-47) (Year: 1995).*
(Continued)

*Primary Examiner* — Iftekhar A Khan
(74) *Attorney, Agent, or Firm* — HP Inc. Patent Department (57) ABSTRACT

In an example, a method includes acquiring, at a processor, a first data model and a second data model. The first data model comprises a representation of at least one property of at least part of a first object and the second data model comprises a representation of at least one property of at least part of a second object. The first and second objects are to be generated in a common additive manufacturing operation. The method may include generating a first print layer model and a second, different, print layer model using the processor by combining at least parts of the first data model and the second data model and generating additive manufacturing instructions based on the first print layer model and the second print layer model.

20 Claims, 4 Drawing Sheets

(51) Int. Cl.

| | |
|---|---|
| G06T 19/00 | (2011.01) |
| G06F 30/20 | (2020.01) |
| G06T 17/10 | (2006.01) |
| B33Y 50/02 | (2015.01) |
| B33Y 10/00 | (2015.01) |
| G06F 119/18 | (2020.01) |

(52) U.S. Cl.
CPC ............. *G06T 17/10* (2013.01); *G06T 19/00* (2013.01); *B33Y 10/00* (2014.12); *B33Y 50/02* (2014.12); *G06F 2119/18* (2020.01); *G06T 2210/16* (2013.01)

(58) Field of Classification Search
USPC .......................................................... 703/6
See application file for complete search history.

(56) References Cited

U.S. PATENT DOCUMENTS

| | | | | |
|---|---|---|---|---|
| 7,665,979 | B2* | 2/2010 | Heugel | B33Y 30/00 425/174.4 |
| 8,606,774 | B1* | 12/2013 | Makadia | G06F 3/048 707/723 |
| 9,348,877 | B2* | 5/2016 | Ramani | G06K 9/44 |
| 10,401,834 | B2* | 9/2019 | Morovic | B29C 64/10 |
| 10,632,672 | B2* | 4/2020 | Vilajosana | B29C 64/393 |
| 2010/0021638 | A1* | 1/2010 | Varanka | B33Y 10/00 427/271 |
| 2010/0191360 | A1* | 7/2010 | Napadensky | B29C 64/40 700/98 |
| 2011/0096341 | A1* | 4/2011 | Jacob | G06Q 30/06 358/1.6 |
| 2011/0205583 | A1* | 8/2011 | Young | G06T 19/20 358/1.15 |
| 2014/0036455 | A1* | 2/2014 | Napadensky | B33Y 80/00 361/748 |
| 2014/0049787 | A1* | 2/2014 | Jacob | G06T 11/60 358/1.6 |
| 2015/0079217 | A1* | 3/2015 | Oudsen | B41J 3/28 425/375 |
| 2015/0094837 | A1* | 4/2015 | Cohen | B33Y 30/00 700/98 |
| 2015/0174695 | A1* | 6/2015 | Elfstroem | B23K 15/0086 219/121.14 |
| 2015/0205544 | A1* | 7/2015 | Webb | H04N 1/4433 358/1.15 |
| 2015/0331402 | A1* | 11/2015 | Lin | B33Y 50/02 700/119 |
| 2016/0008886 | A1* | 1/2016 | Peterson | B22F 10/30 419/53 |
| 2016/0059489 | A1* | 3/2016 | Wang | B29C 64/393 700/119 |
| 2016/0129641 | A1* | 5/2016 | Yamazaki | B29C 67/0088 700/119 |
| 2016/0136889 | A1* | 5/2016 | Rolland | B29C 64/40 264/1.27 |
| 2016/0184893 | A1* | 6/2016 | Dave | B29C 64/393 419/53 |
| 2016/0257033 | A1* | 9/2016 | Jayanti | B29C 64/112 |
| 2016/0263833 | A1* | 9/2016 | Vittitow | B22F 10/30 |
| 2016/0371398 | A1* | 12/2016 | Sugiura | G06F 30/00 |
| 2017/0371318 | A1* | 12/2017 | Morovic | B29C 64/10 |
| 2018/0133957 | A1* | 5/2018 | Ramirez Muela | B33Y 30/00 |
| 2018/0147784 | A1* | 5/2018 | Jiang | B33Y 30/00 |
| 2018/0215104 | A1* | 8/2018 | Rubio | B29C 64/165 |
| 2019/0030821 | A1* | 1/2019 | Garcia | B33Y 50/02 |
| 2019/0111626 | A1* | 4/2019 | Hierro Domenech | B29C 64/165 |
| 2019/0337231 | A1* | 11/2019 | Fan | B29C 64/386 |

FOREIGN PATENT DOCUMENTS

| | | |
|---|---|---|
| EP | 1486317 B1 | 8/2008 |
| EP | 3130450 | 2/2017 |
| JP | 2012096427 | 5/2012 |
| JP | 2013067117 | 4/2013 |
| JP | 2016159603 | 9/2016 |
| JP | 6154543 | 6/2017 |
| RU | 2302945 C2 | 7/2007 |
| WO | 2014207454 A1 | 12/2014 |
| WO | 2015022572 A2 | 2/2015 |
| WO | WO-2015106840 | 7/2015 |
| WO | WO-2016050319 A1 | 8/2016 |
| WO | WO-2016121120 | 8/2016 |

OTHER PUBLICATIONS

Bikas et al. (Additive manufacturing methods and modelling approaches: a critical review, Int J Adv Manuf Technol (2016) 83:389-405) (Year: 2016).*

Zeng et al., "Optimally Orient and Position Multiple Solid Objects for Batch Production in 3D Printing", Abstract, Retrieved from Internet: https://www.researchgate.net/publication/267984753_Optimally_orient_and_position_multiple_solid_objects_for_batch_production_in_3D_printing, Jan. 2014, 2 pages.

Hiller et al., "Design and Analysis of Digital Materials for Physical 3D Voxel Printing", Rapid Prototyping Journal, vol. 15, No. 2, 2009, pp. 137-149.

Maxey, "Printing Multiple Parts at Once", Retrieved from Internet: http://www.engineering.com/3DPrinting/3DPrintingArticles/ArticleID/5980/Printing-Multiple-Parts-at-Once.aspx, Jul. 9, 2013, 4 pages.

* cited by examiner

GENERATING ADDITIVE MANUFACTURING INSTRUCTIONS

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods or binding materials, may be used.

Data relating to a three-dimensional object to be generated may be provided to an additive manufacturing apparatus and used to generate the three-dimensional object. In some examples, more than one object may be generated at once.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In some examples, the build material may be a resin, which is cured or solidified with light or another energy source. The choice of light intensity and/or wavelength may affect the properties of the solidified material.

In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner. A coalescence modifying agent (also referred to as modifying or detailing agents), which acts to modify the effects of a fusing agent for example by reducing or increasing coalescence or to assist in producing a particular finish or appearance to an object, and such agents also be used as a print agent in some examples. A coloring agent, for example comprising a dye or colorant, may in some examples be used as a fusing agent or a modifying agent, and/or as a print agent to provide a particular color for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

In some examples set out herein, it may be intended to print a number of objects in a single build process. This may for example increase the throughput of an additive manufacturing apparatus and increase energy efficiency. In some examples, the presence of one object may have an influence on another, so the placement of print agent may be different for building objects which share a bed than when the objects are built individually.

For example, considering thermal management, where a single object is to be generated, a fusing agent may be applied which results in a general warming of the print bed material when the print bed is irradiated. If a second object is manufactured nearby, this can cause additional heating of the build material between the first and second object, which may increase the temperature to fusing temperature.

In some examples, a "new object" may be defined comprising both or all objects to be generated at once. Defining such an object is complicated and demanding on computing resources. Moreover, any change to the composition of the objects being generated together, or their relative placement, will result in the model being obsolete.

In some examples set out herein, a model of a print layer may be composed to include the content of each individual part of the build job that intersects that layer. In some examples, a 'bounding box' is defined. A bounding box may include any parts of the object which intersect a layer enclosed in a rectangle which at least encloses the slice of the object corresponding to that layer, and in some examples provides a buffer around the slice of the object. In some examples, when composing a build material layer, it may be that the bounding boxes corresponding to two or more parts intersect.

Figure 1:
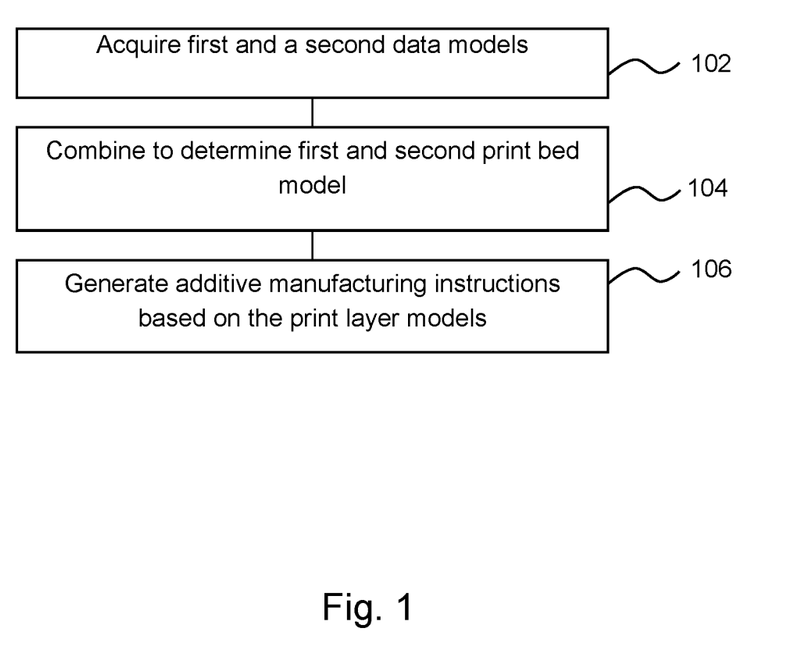
FIG. 1 is a flowchart of an example method for generating additive manufacturing instructions.

FIG. 1 is an example of a method, which may be a computer implemented method for defining print instructions, comprising, in block 102, acquiring at a processor, a first data model and a second data model, wherein the first data model comprises a representation of at least one property of at least part of a first object and the second data model comprises a representation of at least one property of at least part of a second object, and the first and second objects are to be generated in a common additive manufacturing operation.

The first and second data models may describe at least one object property. For example, the first and second data models may comprise a representation of geometric properties, in which case the first data model may comprise a first geometric model and the second data model may comprise a second geometric model, the first and second geometric models characterising the geometry of the first and second volumes respectively.

In another example, the first and second data models may comprise (in some examples, in addition to a geometrical model) a representation of distance properties, in which case the first data model may comprise a first distance model and the second data model may comprise a second distance model. Each distance model characterises the distance of a plurality of locations within a volume comprising at least part of a modelled object from a boundary of the object. Such a distance model may for example comprise a 'distance transform' or a 'distance map'. For example, the locations may comprise voxels (i.e. three-dimensional pixels) inside or outside the object. The distance may in some examples be the closest distance to an object boundary. To consider an example in which the volume is a bounding box enclosing a slice of the object, a plurality of object voxels (which, as the slice is at least approximately two-dimensional, correspond to pixels on a surface of the slice) may be described in terms of their minimum depth from an object surface. Voxels which are inside the volume but outside the object may also be characterised in terms of their distance from the outer perimeter of the object.

In other examples, the first and second data models may comprise a representation of other object properties, for example object color, conductivity, resilience, surface finish, porosity, weight, strength, etc.

In some examples, first and second data models describe a property or properties over a volume enclosing at least part of the object (and in some examples, a slice of the object). In some examples, the objects may be generated such that the volumes overlap. In some examples, each of the first and second data models represent at least one object property over one or a plurality of slices of an object enclosed in a bounding box. The bounding boxes of a slice may partially overlie one another when the objects positioned in an intended relative location for object generation.

The objects may be different or may be the same (for example, multiple copies of an object may be generated in a single additive manufacturing operation). In some examples, the data models may be acquired from a local memory. In some examples, the data models may be provided over a network.

Block 104 comprises generating, using the processor, a first print layer model and a second, different, print layer model by combining at least parts of the first data model and the second data model.

A print layer model may comprise a data model of any aspect (for example, attribute or property) of an intended print, or object generation, layer. The layer may comprises (or be intended to comprise) at least part of the first and second object. For example, the print layer model may model any or any combination of (i) a geometrical property of a layer (for example, the location of object portions within the layer), (ii) relative geometrical properties (for example, a model may characterise a separation between objects), (iii) a variation of any property or combination of properties (e.g. color, conductivity, strength, density, porosity, translucence or the like) over a layer; (iv) a condition of manufacture, such as a thermal model of the layer, or the like. The property or properties modelled by a print layer model may depend on (or in some examples, correspond to) the properties described by the first and second data models (or the parts thereof which are combined) and/or on a function used to combine the data models.

The print layer models may be generated on a layer by layer basis. In some examples, at least one print layer model may be generated for each layer in object generation. The first and second print layer models may relate to the same layer of object generation. The different print layer models may, in some examples, be generated by applying a different function to the same parts of the first and second data models. In some examples, the different print layer models may be generated by applying the same or different functions to different parts of the first and second data models. Parts of the data models may for example comprise geometrical models, distance models and/or one or more models relating to other object properties, such as mechanical or appearance properties. The data models may describe one or more slices of an object. In some examples, parts of the data models representing or describing a common property may be combined to form a print bed model.

For example, the first print layer model may be generated by combining geometrical models of a slice of two objects (for example, enclosed by a bounding box), and the second print layer model may be generated by combining distance models of the object slices. The function used to combine the models may be different or the same.

In another example, the first print layer model may be generated by combining geometrical models of a slice of two objects (for example enclosed by a bounding box) using an 'AND' function, whereas the second print layer model may be generated by combining geometrical models of the slices using an 'OR' function.

Other examples of functions are described below.

In some examples, the relative placement of the objects (or object slices in a layer) for object generation may be predetermined. In other examples, a 'trial' relative placement may be assumed, and multiple such trials could be performed to determine the relative placement. The combination may be carried out based on an intended (or trial) relative placement of the objects during object generation.

In some examples, while the objects may be the same, the data representing the objects which are combined to form a print layer model may be different. For example, generation of one instance of the object may be intended to at least start earlier than generation of another instance of the object, and the data which is combined to form a print layer model may represent slices at different heights within an object. In other examples, the data combined may be the same for both object models.

In some examples, the first and second data models may be combined using a combining function which is chosen to inform at least one aspect of the manufacturing process, for example the placement of print agent. For example, as has been noted above, objects which are close to one another may cause relative heating. The potential for one object to cause heating in another and/or vice versa may be explored by considering relative proximity of the objects, and/or their relative size.

In some examples, there may be potential for print materials such as print agents to bleed into a surrounding area. For example, a colored print agent may discolour build material which is outside the perimeter of the object to be colored. In other examples, bleeding may be exploited, for example to provide a translucent or 'color fade' effect at a surface of an object. The extent of such bleeding could be modelled, for example using 'alpha blending'. A function could be applied to identify, for example based on a color specified in the information characterising the object, the likely spread of color. Such an effect may not be linear, and therefore the amount of print agent which may be present at a location may be determined based on a function which depends on the distance, but which varies in a non-linear fashion, wherein the function may be based on modelled behaviour or measured behaviour.

Other properties, for example, conductivity, density, resilience, porosity, object strength and the like can be affected by the print agent applied, which may extend into neighboring regions. In some examples, there may be a possibility that print agents are wicked into neighboring areas, so that to achieve an intended concentration, extra print agent should be applied.

Block 106 comprises generating additive manufacturing instructions based on the print layer model. In some examples, these may comprise additive manufacturing instructions for generating a layer or the respective objects and the process may be iterated with data relating to other intended layers of object generation.

By generating models on a layer-by-layer basis, processing may be kept simple and the data may be combined late in the data processing cycle, preserving flexibility. In some examples, print layer model(s) may expose a way in which the objects could interact or influence one another during object generation, and such influence may be countered with an appropriate application of print agent.

For example, if one object is liable to cause overheating of another object, or overheating may be seen between objects, this could be countered by applying fusion reduction agent between the objects. In another example, where the color of one object is liable to discolour another object, this could be countered for example by reducing the amount or concentration of print agent applied to an object inside or at an object boundary, or by generating a color mix which allows an acceptable color to be applied to an object without unduly affecting other object(s). For example, a color which averages the color of two objects (which may be a weighted average) could be used, or a lighter color adopted. In another example, a stronger color print agent could be used inside an object perimeter to bleed through to provide the surface with an intended color, while reducing the perimeter of the bleed effect outside the object.

Figure 2A:
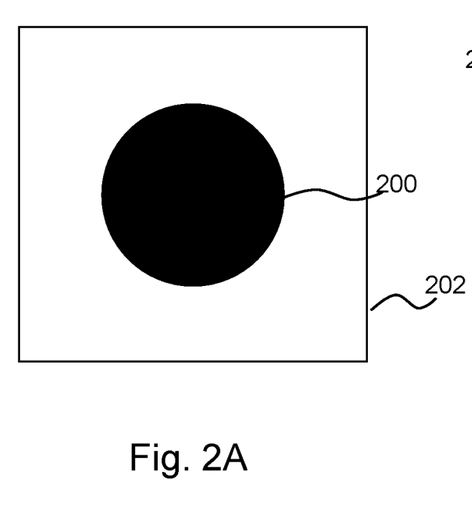
FIGS. 2A to 2D are schematic drawings illustrating compositions of data representing part of a three dimensional object according to one example.

FIG. 2A shows an example of a volume enclosing a slice of an object 200, where black indicates the presence of an object 200 and white indicates the absence of the object 200. The volume comprises a 'bounding box' 202. Bounding boxes may be used in three-dimensional object modelling to simplify certain modelling tasks. In some examples, a 'smallest bounding box' may be defined comprising the smallest cuboid which can contain an object, although other bounding boxes may comprise at least a perimeter around the object and in some examples the bounding box may be significantly larger than the object. The model of FIG. 2A may be termed a 'geometrical model' of the object as it characterises the geometry thereof.

In this example, the object 200 to be generated has, at least in one layer thereof, a circular form. In some examples, the object to be generated may be described in three dimensions. In some examples, a three dimensional model may be 'rasterised' to form slices, or the model data relating to a particular slice may be identified using a coordinate (by convention, this may be a z coordinate, with the object layers lying in xy planes).

Figure 2B:
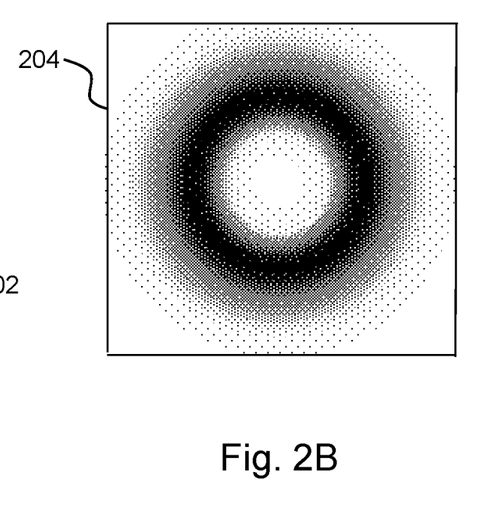

FIG. 2B shows a distance model 204 for a volume comprising a slice of the object 200 shown in FIG. 2A. This is shows, for each location within the slice enclosed by the boundary box, how close each pixel is from an object boundary. In this example, the lightness of the Figure increases with distance.

In the example of FIG. 2B, there is no distinction made regarding interior and exterior voxels. However, in some examples, exterior voxels may be associated with a negative value in the distance model and interior voxels may be associated with a positive value (or vice versa).

In this example, it is intended to manufacture two of the same object, although in other examples, the objects to be manufactured in a single print operation may be different from one another, and/or there may be any number of objects.

Figure 2C:
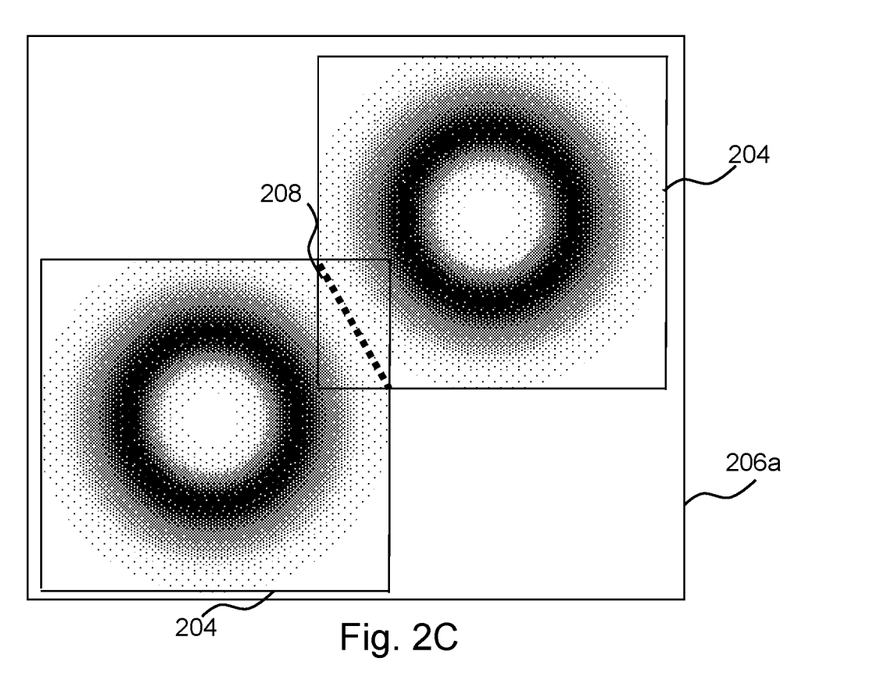

FIG. 2C shows two distance models 204 superimposed in a first print layer model 206a. In this example, the distance models 204 have been combined according to a 'Minimum function' to determine when a pixel/voxel is associated with the same distance from the first object boundary as from the second object boundary. The 'minimum' function may retain the lower of the two distance values until a mid-line contour 208 may be identified. In this way, a contour 208 may be identified as being equally close to both objects. Such a contour may for example determine the mid-point of a ramping function between the two objects and therefore inform the placement of print agent.

In another example, a function which varies non-linearly with distance, for example an 'alpha blending' function, may be applied. Such a function may for example estimate color bleed, or any other property transition, in to a region of the volume surrounding, or within, an object.

In a still further example, a threshold function may be used to combine the distance models, for example to identify any features which are within a threshold distance of one or both objects (wherein the thresholds may the same or may be different for different objects).

Other functions could be used according to the property of interest, for example based on models of that property varies with distance from or inside the object.

Such functions may be used alone or in combination.

Figure 2D:
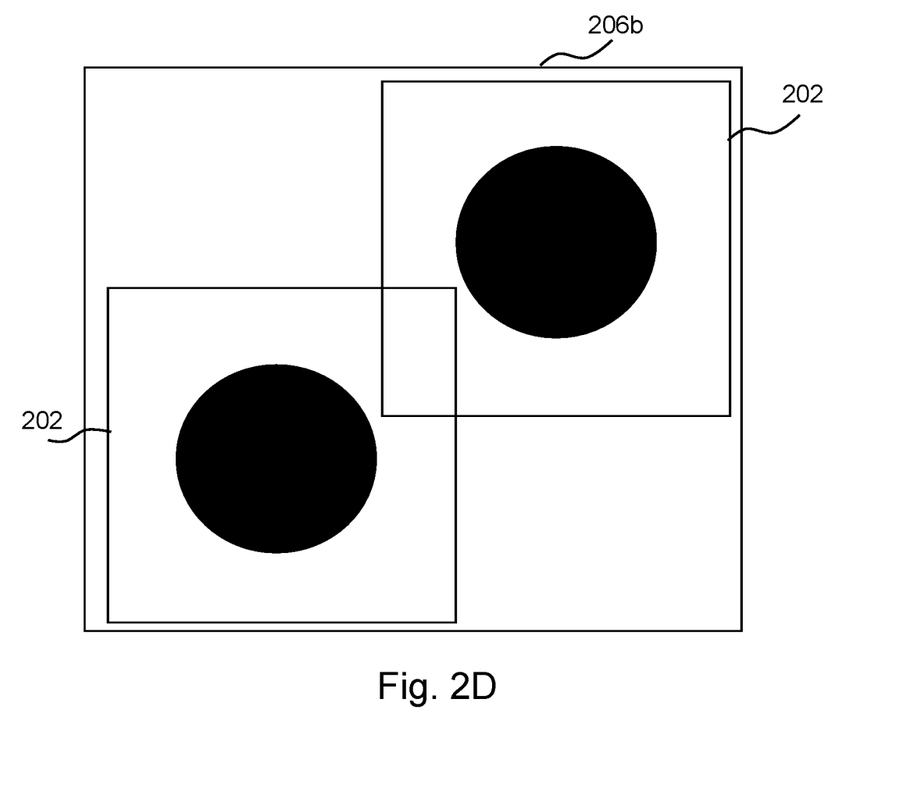

In some examples, the distance models may be determined from a geometric model of the object. Such geometric models may also be combined to provide a geometrical print layer model 206b, as is shown in FIG. 2D, in this example using a pixel-wise OR function to characterise the presence or absence of an object from a voxel of the print bed.

Although FIG. 2 considers a two dimensional slice, distances could be reviewed outside the print bed plane, for example using distance models indicating distances in a different direction. For example other distance models may represent a distance to a boundary in one or both z directions (an up and/or down direction), and/or in an xyz dimension (for example identifying the closest boundary in any direction). Distance models for a given direction and for different objects may be combined to produce print layer models.

The composition of the properties of individual objects into a print layer model may be carried out pixel by pixel (or, equivalently in a plane, voxel by voxel). For example, pixel-, or voxel-wise combinations of data defining a portion of the first and second objects to be manufactured in a single layer of an additive manufacturing process may be performed.

In one example, this combination may be expressed as:
$B_{ij}=op(B_{ij}, [P_{ij}]_{1-n})$ where B represents the full bed size image buffer and P the part of the data model to be combined, for example the geometrical or distance model of the object slice enclosed by its boundary box.

Thus an initial print layer model $B_{ij}$ may be combined with the distance, geometric and/or other models of layers of each of the objects to be generated, given an intended relative placement of the objects during object generation.

The suffix ij correspond to the x and y coordinates of each pixel in the process. $P_n$ for a given object n (or indeed the set of objects) may not exist for each object at each ij pixel (and/or may be zero for locations outside the boundary box).

The operator function op( ) may be chosen based on the feature to be exposed (e.g. alpha blending for color, another functions to determine a separation mid-line, thermal spread model function, or the like). For example, applying a minimum operation, $B_{ij}=\min(B_{ij}, [P_{ij}]_{1-n})$, may identify the contour indicating the minimum separation between objects. Such an operator may be applied to at least one distance model.

Generating the additive manufacturing print instructions in block 106 may comprise any or any combination of generating an instruction relating to a location for a placement of a fusion enhancing print agent, a location for a placement of a fusion reduction print agent, an amount of at least one print agent to be applied at at least one location; at least one type of print agent to be applied at at least one location; a type of build material to be used in object manufacture, at least one manufacturing temperature, at least one manufacturing time, at least one light intensity; and/or at least one radiation wavelength. Wavelength and intensity may for example be of interest when curing resin.

In some examples, the method may comprise applying a function to at least part of the first and/or second data models before the models are combined. In other examples, the method may comprise combining at least parts of the first and second data models before a function is applied. In both cases, the data models may be maintained as distinct data files until relatively late in the object generation data processing pipeline. This allows for versatility as individual objects may be removed, and/or new objects added, right up to the point of object generation. For example, where multiple copies of the same object are to be generated, this means that the composite of the objects need not be fully modelled at an early stage: the data relating a single object may be used multiple times.

Moreover, some data may be relatively easy to determine on a 'per object' basis, but may be obscured if a full composite model is built. For example, geometric models of individual objects may be used to determine an area and perimeter of each individual part for each layer. This can be used to calculate build material and print agent to be used in generating the part which could be used to estimate the cost of the part.

In some examples, the method further comprises generating an object according the additive manufacturing instructions.

Figure 3:
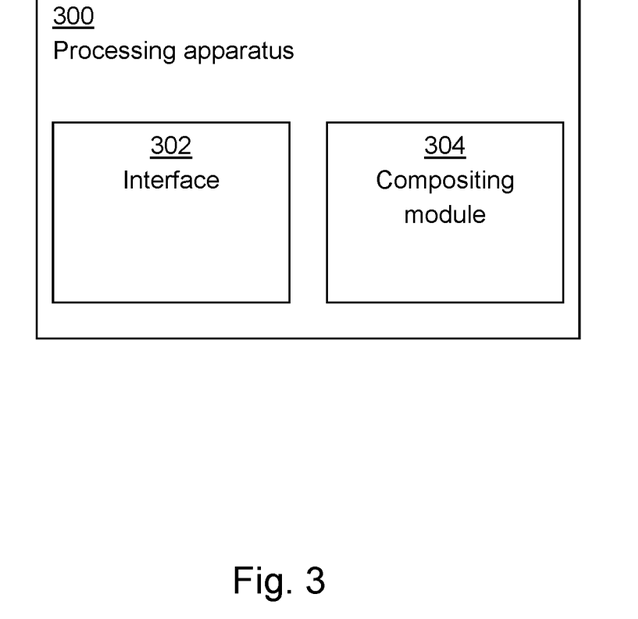
FIGS. 3 and 4 are examples of processing apparatus.

FIG. 3 is an example of a processing apparatus 300 comprising an interface 302 and a compositing module 304. The interface 302 is to receive data representing a first and second volume, the first and second volume respectively describing at least part of a first and second object to be generated in a common additive manufacturing operation. The data for each volume comprises at least one of (i) a geometric model characterising the geometry of each volume, and (ii) a distance model characterising the distance of a plurality of locations within each volume from a boundary of the object. In some examples, the volumes may be object slices enclosed by boundary boxes.

The compositing module 304 is configured to generate a first print layer model and a second, different, print layer model by combining at least parts of the data representing a first and second volume. For example, the compositing module 304 may generate a (i) a first print layer model by combining the distance models of the first and second volumes; and (ii) a second print layer model by combining the geometrical models for the first and second volumes.

As has been noted above, in some examples, a plurality of print layer models may be determined by combining the distance models using different functions. Moreover, in some examples, plurality of distance models charactering different directions may be provided, and at least one print layer model may be determined by combining the distance models for different directions.

Data characterising other object properties may also be provided and may be combined to produce print layer models.

Figure 4:
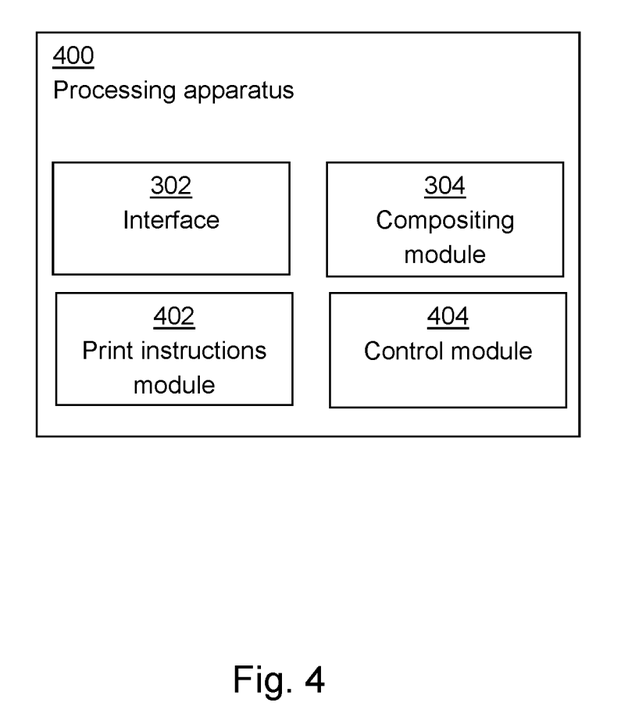

FIG. 4 is another example of a processing apparatus 400, comprising (in addition to the components of the processing apparatus 400 of FIG. 3, which are labelled with like numbers) a print instructions module 402 and a control module 404.

The print instructions module 402 is configured to determine print instructions based on the print layer models. For example the instructions may be instructions to control the placement of at least one print agent, or to control a manufacturing temperature, or the like. In some examples, the print instructions may comprise instructions to modify existing print instructions for one or the set of objects. The control module 404 is configured to control an additive manufacturing apparatus to generate the first and second object based, at least in part, on the print instructions.

Figure 5:
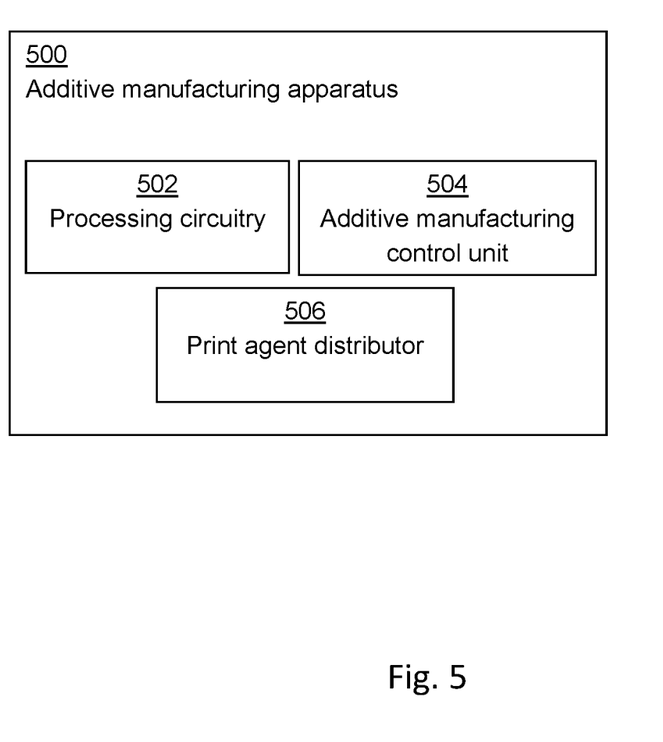
FIG. 5 is a schematic drawing of an example additive manufacturing apparatus.

FIG. 5 shows an example of additive manufacturing apparatus 500 comprising processing circuitry 502, an additive manufacturing control unit 504 and a print agent distributor 506.

The processing circuitry 502 is configured to acquire a first data model and a second data model, wherein the first data model comprises a representation of at least part of a first object and the second data model comprises a representation of at least part of a second object and the first and second objects are to be generated in a common additive manufacturing operation. The data models may represent the geometry and/or at least one property, and/or comprise a distance model of a layer, or slice, of each object. The processing circuitry 502 is further configured to determine, a print layer model indicative of an influence of a presence of the first object on at least one property the second object by applying an analysis function to the first data model and the second data model. In some examples, the influence is an influence on the generation of the first object (for example, a temperature of object generation). In some examples, the influence is an influence on at least one property of the first object when generated (for example, a color). In addition, the processing circuitry 502 may be configured to determine at least one object generation instruction to counter the influence.

In some examples, the data models comprise geometric models and/or distance models and/or other object property models. In some examples, the distance models may be derived from geometric models. In some examples, determining an indication of an influence of a presence of the first object on at least one property the second object by applying may comprise determining at least two print layer models.

The additive manufacturing control unit 504 is configured to control object generation according to the object generation instruction(s).

The object generation instructions are to control distribution of print agent via the print agent distributor 506. The print agent distributor 506 may for example comprise at least one print head, which may travel relative to a surface of build material. In some examples, a layer of build material may be formed on a print bed within a fabrication chamber (which may be part of the additive manufacturing apparatus, or may be part of a separate apparatus), and print agent applied to the layer. The layer may be irradiated with energy to cause selective solidification and a new layer of build material may be formed there over, with the process repeating layer after layer until an object is formed. The additive manufacturing apparatus 500 and/or any coupled apparatus may comprise additional components, such as heaters, irradiation energy sources, cleaning apparatus, build material distributors, mechanical components and the like.

By providing the processing circuitry 502 on an additive manufacturing apparatus 500, the objects may be combined into a single build operation at the end of the data processing pipeline, which increases the versatility of the pipeline and avoids unnecessary processing for example if an intended 'batch build' job changes, right up to the point of manufacture.

In some examples, there may be more than two objects to be generated, and the processing circuitry 502 may be configured to receive a third data model wherein the third data model is a representation of at least part of a third object and to determine an indication of a mutual influence of the presence of the other objects on each of the first, second and third object by applying an analysis function to the first, second and third data models.

The processing circuitry 502 may have any of the features of the processing apparatus 300, 400, and vice versa. The processing circuitry 502 and/or the processing apparatus 300, 400 may be configured to carry out the method of FIG. 1.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and blocks, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (for example, the processing apparatus 300, 400, interface 302, compositing module 304, print instructions module 402, control module 404, and/or processing circuitry 502) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, by a system comprising a hardware processor, a first data model and a second data model, wherein the first data model comprises a representation of at least one property of at least part of a first object the second data model comprises a representation of at least one property of at least part of a second object, and the first and second objects are to be generated in a common additive manufacturing operation;
   generating, by the system, a first print layer model by applying a first function on the first data model and the second data model;
   generating a second print layer model by applying a second function on the first data model and the second data model, wherein the first function is different from the second function; and
   generating additive manufacturing instructions based on the first print layer model and the second print layer model.

2. The method of claim 1, wherein the generating of the additive manufacturing print instructions comprises at least one of:
   specifying a location for a placement of a fusion enhancing print agent,
   specifying a location for a placement of a fusion reduction print agent;
   specifying an amount of at least one a print agent to be applied at a location;

specifying a type of print agent to be applied at a location;
specifying a type of build material;
specifying a manufacturing temperature;
specifying a manufacturing time;
specifying a light intensity; or
specifying a radiation wavelength.

3. The method of claim 1, further comprising generating an object according to the additive manufacturing instructions.

4. The method of claim 1, wherein the first data model comprises a first geometric model and the second data model comprises a second geometric model, the first geometric model characterizing a geometry of the first object, and the second geometric model characterizing a geometry of the second object, and wherein the generating of the first print layer model comprises combining the first and second geometrical models using the first function.

5. The method of claim 1, wherein the first data model comprises a first distance model and the second data model comprises a second distance model, wherein the first distance model characterizes distances of a plurality of locations within a volume from a boundary of the first object, and the second distance model characterizes distances of a plurality of locations within a volume from a boundary of the second object, and wherein the generating of the first print layer model comprises combining the first and second distance models using the first function.

6. The method of claim 1, wherein the applying of the first function comprises applying at least one function selected from among:
a pixel-wise or voxel-wise OR function,
a minimum separation determination function,
an alpha blending function, or
a pixel-wise or voxel-wise AND function.

7. The method of claim 1, wherein the first data model characterizes a property of a first volume bounded by a boundary box and comprising a layer of the first object contained in the first volume, and the second data model characterizes a property of a second volume bounded by a boundary box and comprising a layer of the second object contained in the second volume, and wherein the generating of the first print layer model comprises performing a pixel-wise or voxel-wise combination of the first and second data models.

8. A non-transitory machine-readable storage medium comprising instructions that upon execution cause a system to:
receive a first geometric model representing a geometry of a first object, and a second geometric model representing a geometry of a second object;
receive a first distance model representing distances of a plurality of locations within the first object from a boundary of the first object, and a second distance model representing distances of a plurality of locations within the second object from a boundary of the second object;
generate a first print layer model by combining the first geometric model of the first object and the second geometric model of the second object; and
generate a second print layer model by combining the first distance model of the first object and the second distance model of the second object, wherein the first print layer model and the second print layer model are for a same layer of object generation of the first and second objects by an additive manufacturing machine.

9. The non-transitory machine-readable storage medium of claim 8, wherein the instructions upon execution cause the system to determine print instructions based on the first and second print layer models.

10. The non-transitory machine-readable storage medium of claim 9, wherein the instructions upon execution cause the system to control an additive manufacturing apparatus to generate the first and second object based on the print instructions.

11. An additive manufacturing apparatus comprising:
a processor; and
a non-transitory storage medium comprising instructions executable on the processor to:
acquire a first data model and a second data model, wherein the first data model comprises a representation of at least part of a first object the second data model comprises a representation of at least part of a second object, and the first and second objects are to be generated in a common additive manufacturing operation;
determine, a print layer model indicative of an influence of a presence of the first object on at least one property of the second object by applying an analysis function to the first data model and the second data model;
determine an object generation instruction to counter the influence; and
control object generation according to the object generation instruction.

12. The additive manufacturing apparatus of claim 11, wherein the influence is an influence on a generation of the first object.

13. The additive manufacturing apparatus of claim 11, wherein the influence is an influence on a property of the first object when generated.

14. The additive manufacturing apparatus of claim 11, further comprising a print agent distributor, wherein the object generation instruction is to control distribution of a print agent via the print agent distributor.

15. The additive manufacturing apparatus of claim 11, wherein the instructions are executable on the processor to:
acquire a third data model that is a representation of at least part of a third object and
determine a print layer model indicative of a mutual influence of the first, second and third objects on one another by applying an analysis function to the first, second and third data models.

16. The method of claim 1, wherein the first print layer model and the second print layer model relate to a same layer of object generation according to the additive manufacturing instructions by an additive manufacturing machine.

17. The method of claim 1, wherein the first function when applied to the first data model and the second data model identifies a color bleed between volumes of the first object and the second object.

18. The method of claim 1, wherein the first function when applied to the first data model and the second data model identifies a thermal spread between volumes of the first object and the second object.

19. The method of claim 1, wherein the first print layer model is indicative of an influence of a presence of the first object on at least one property of the second object, based on applying the first function to the first data model and the second data model.

20. The additive manufacturing apparatus of claim 11, wherein the analysis function identifies a color bleed or a thermal spread between volumes of the first object and the second object.

* * * * *